Patented June 22, 1948

2,443,885

UNITED STATES PATENT OFFICE 2,443,885

PRODUCTION OF AMINOANTHRAQUINONES

Curt Bamberger, Buffalo, N. Y., assignor to Allied Chemical & Dye Corporation, New York, N. Y., a corporation of New York No Drawing. Application December 21, 1942,
Serial No. 469,678

8 Claims. (Cl. 260—382)

1

This invention relates to an improved process for the production of aminoanthraquinones. More specifically, it relates to an improved process for aminating anthraquinone sulfonates to convert them into the corresponding aminoanthraquinones.

It was known heretofore to produce aminoanthraquinones by heating alpha- or beta-anthraquinone mono- or di-sulfonates with a large excess of aqueous ammonia in an autoclave. Thus, German Patent 175,024 discloses the production of 1-aminoanthraquinone by heating 1-anthraquinone-potassium sulfonate with a large excess of aqueous ammonia in an autoclave. German Patent 256,515 discloses that the yields thus obtained are unsatisfactory, but can be increased by including in the reaction mixture an oxidizing agent; such as manganese dioxide, copper oxides, bichromate, silver oxide, or arsenic acid. German Patent 391,073 discloses that the use of the inorganic oxidizing agents of German Patent 256,515 leads to disadvantages; thus, arsenic acid produces only moderate yields of 1-aminoanthraquinone. According to German Patent 391,073, the use of meta-nitro-benzene-sodium sulfonate as an oxidizing agent in the amination of anthraquinone sulfonates overcomes such disadvantages; superior yields of 1-aminoanthraquinone are said to be produced as compared with those obtained for instance with arsenic acid in the process of German Patent 256,515.

The processes of German Patents 256,515 and 391,073, when applied in large scale commercial operations, fail to produce the high yields claimed for them in the patents. Further, the use of meta-nitro-benzene-sodium sulfonate, as an oxidizing agent in the preparation of 1-aminoanthraquinone in accordance with German Patent 391,073, has the disadvantage of salting out the 1-anthraquinone sulfonate to be aminated, so that it requires maintenance of relatively low concentrations of the anthraquinone sulfonate in the reaction mixture (e. g., not more than 16% by weight of 1-anthraquinone-sodium sulfonate) to avoid technical difficulties when the process is applied on a large scale.

I have discovered that the amination of anthraquinone sulfonates can be effectively carried out on a large scale in commercial operation without the aforesaid difficulties, by heating an anthraquinone sulfonate at an amination temperature with an ammonium salt of arsenic acid in an aqueous solution having a pH within the range 6.5 to 9.6, preferably 6.9 to 7.8, and especially 6.9 to 7.3. Thus, I have discovered that

2 anthraquinone alpha-sulfonates, and especially 1-anthraquinone-sodium sulfonate (commonly known as "golden salt"), can be aminated economically on a large scale, under the aforesaid conditions, to obtain high yields of the corresponding aminoanthraquinones, the products being readily recovered from the reaction mixture in a high state of purity.

The process of the present invention has a number of advantages as compared with the prior processes referred to above. Thus the amount of ammonia required for optimum results is reduced to a minimum not heretofore possible, resulting in a material saving in raw materials consumed. For instance, while in the process of German Patent 265,515 a minimum of about six mols of ammonia are employed for each mol equivalent of sulfonate radical, and other processes employ a much larger excess of ammonia, optimum results are obtained in the process of the present invention by using four molecular equivalents of ammonia (in the form of an ammonium arsenate) per mol equivalent of sulfonate radical. Further, 1-anthraquinone-sodium sulfonate can be employed in higher concentrations in the reaction mixture, without impairing the yield or quality of the 1-aminoanthraquinone produced and without interfering with the fluidity of the reaction mixture under the reaction conditions, thereby increasing the productive capacity of the amination equipment without interfering with effective agitation of the reaction mixture.

The amination temperature at which the reaction mixture is heated depends largely upon the nature of the anthraquinone sulfonate subjected to amination; thus, beta-anthraquinone sulfonates require a higher amination temperature than the corresponding alpha-anthraquinone sulfonates. This fact provides the basis of an important feature of one aspect of the present invention; namely, the obtainment of 1-aminoanthraquinone of high purity from 1-anthraquinone sulfonate contaminated with 2-anthraquinone sulfonate by heating the contaminated 1-anthraquinone sulfonate with the ammonium arsenate at the amination temperature for conversion of the 1-anthraquinone sulfonate without substantial conversion of the 2-anthraquinone sulfonate to aminoanthraquinone.

In carrying out the process of my invention in accordance with one method of procedure, an anthraquinone sulfonate is mixed with an ammonium salt of arsenic acid in an aqueous solution having a pH within the aforesaid ranges, and the mixture is heated with agitation at an aminating temperature until amination is substantially complete. After cooling, the resulting aminoanthraquinone can be recovered from the reaction mixture in any desired manner; for instance by filtration of the insoluble aminoanthraquinone from the remaining reaction mixture, washing the filter cake with hot water, and drying.

Preferably the anthraquinone sulfonate, which may be an alpha- or beta-, mono- or poly-sulfonate, is employed in the form of a water-soluble, neutral (as distinguished from an acidic or basic) salt, and more particularly an alkali metal salt.

The ammonium salt of arsenic acid is preferably prepared by mixing ammonia and an aqueous solution of arsenic acid in sufficient amount to bring the pH of the resulting solution to at least 6.5 (which in terms of ammonium arsenate solution corresponds with a mixture of 20% of mono-ammonium arsenate and 80% of diammonium arsenate; i. e., a molar ration of $NH_3$ to arsenic acid of 1.8:1), but not more than 9.6 (which corresponds with 100% triammonium arsenate; i. e., a molar ration of $NH_3$ to arsenic acid of 3.0:1). Within this range, pH limits of 6.9 to 7.8 (which correspond, respectively, with mixtures ranging from 5% of mono-ammonium arsenate and 95% of diammonium arsenate to 75% of diammonium arsenate and 25% of triammonium arsenate; i. e., molar rations of $NH_3$ to arsenic acid ranging from 1.95 to 2.25:1) are preferred, and especially pH limits ranging from 6.9 to 7.3 (which correspond roughly with diammonium arsenate; i. e., a molar ration of $NH_3$ to arsenic acid of approximately 2:1). By employing solutions whose pH values lie within the preferred range of 6.9 to 7.8, yields of about 90% or more of the theoretical yield of 1-aminoanthraquinone, based on the weight of 1-anthraquinone-sodium sulfonate, can be obtained; with a solution having a pH of 6.5, the yield is of the order of 75% of theory. At a pH below 6.5 the yields become increasingly lower, such that the operation becomes uneconomical. Optimum results, in so far as purity and yield are concerned, are obtained within the especially preferred pH range of 6.9 to 7.3.

For optimum results, the amount of ammonium arsenates employed in relation to the amount of anthraquinone sulfonate is preferably such that about four molecular equivalents of the ammonium radical are present for each equivalent of sulfonate radical. The quantity of ammonium arsenate can be decreased to about three equivalents of ammonium radical per equivalent of sulfonate radical, but in general the yield is also decreased. Larger proportions of the ammonium salt do not materially increase the yield, although in some cases the rate of amination is thereby increased.

When anthraquinone poly-sulfonates are aminated according to the invention, the relative amount of ammonium arsenates used is correspondingly greater than the amounts employed in amination of mono-sulfonates, in accordance with the number of sulfonate groups contained in the intermediate anthraquinone compound.

The concentration of 1-anthraquinoe-sodium sulfonate in the reaction mixture can be as high as 26.4% without encountering technical difficulties in large scale operation. This is apparently due to the fact that the ammonium arsenates have no material salting out effect upon the 1-anthraquinone-sodium sulfonate, and the latter is retained in solution throughout the reaction. The yield and quality of the product are not appreciably affected by use of lower concentrations of the anthraquinone sulfonate down to about 10%.

The amination temperature which I employ for amination of anthraquinone alpha sulfonates ranges from about 200° C. to about 250° C. At these temperatures, the vapor pressure of the mixture may vary from about 225 to more than 500 pounds per square inch (absolute). The reaction is therefore advantageously carried out in an autoclave capable of withstanding the pressure generated at the temperature employed. Preferably temperatures from 220° to 240° C., and especially from 230° to 240° C. are used. Within the latter range, the product is obtained in optimum yield and purity within a minimum reaction period. Within the preferred temperature range, the duration of the amination of 1-anthraquinone-sodium sulfonate is about 9 to about 12 hours, while for anthraquinone-1,5-disulfonate, the amination requires about 24 hours. Longer reaction periods do not materially improve the results. At temperatures below 220°, but above 200° C., the reaction period is preferably increased to obtain optimum yields; neither the quality nor the yield of the aminoanthraquinone compounds obtained within said lower temperature range is improved thereby.

When the reaction is complete the insoluble aminoanthraquinone can be recovered from the reaction mixture in any desired manner, as for instance by filtration. Ammonia can be recovered from the filtrate by treatment with caustic alkali, distillation and absorption of the ammonia given off in a suitable absorbing system; and the arsenic acid compounds can then be recovered if desired from the remaining portion of the filtrate.

The process according to the invention is illustrated by the following examples wherein temperatures are in degrees centigrade, and parts are by weight unless designated as parts by volume. Where parts are by volume, the amount signifies the volume occupied by the same number of parts by weight of water at 4° C.

*Example 1.*—950 parts of aqueous arsenic acid containing 712 parts of $H_3AsO_4$ are mixed with 1250 parts of ice. The solution is agitated rapidly, and concentrated aqueous ammonia of about 26° Bé. at 15° is added until the resulting solution of ammonium arsenate has a pH of 6.5. The mixture is divided into 5 equal portions. Each portion is diluted with water to 700 parts by volume, and concentrated aqueous ammonia is added to all but one portion to form a series of solutions having pH values as follows:

|  | pH |
|---|---|
| No. 1 | 6.5 |
| No. 2 | 7.02 |
| No. 3 | 7.3 |
| No. 4 | 7.6 |
| No. 5 | 7.8 |

To each of the resulting solutions, 165 parts of commercial "golden salt" are added, comprising 155 parts of 1-anthraquinone-sodium sulfonate and about 8 parts of 2-anthraquinone-sodium sulfonate ("silver salt"), the balance being sodium chloride. Each of the mixtures thus obtained is agitated and heated in an autoclave for 12 hours at 220°, the pressure rising to about 320 pounds per square inch (gauge pressure). After cooling to room temperature in the autoclave, whereby the superatmospheric pressure is relieved, the mixtures are filtered and the resulting filter cakes of 1-aminoanthraquinone are washed with hot water until the washings are colorless, and the filter cakes are dried.

The resulting products are tested for purity by conversion to 1-benzoylaminoanthraquinone in the following manner, and the results obtained are summarized in the Table: 20 parts of the product are mixed with 120 parts by volume of dichlor-benzene, and 60 parts by volume of benzoyl chloride are added. The mixture is agitated and heated for two hours at 110° to 120°, then cooled to 25°, and maintained at that temperature for ½ hour. The mixture is then filtered and the filter cake is washed, first with 30 parts by volume of chlor-benzene and then with methanol, until the washings are colorless and no longer contain free benzoyl chloride. The filter cake is dried at 100° to 110° and weighed. The weight of the dry product is the benzoyl number.

TABLE

*Yield of aminoanthraquinone from 155 parts of 100% 1-anthraquinone-sodium sulfonate*

| pH of Amination | Actual Parts | Per cent Theory | Benzoyl No. |
|---|---|---|---|
| 6.5 | 84.5 | 76 | 27.6 |
| 7.02 | 110 | 98.5 | 27.8 |
| 7.3 | 110.3 | 98.7 | 27.8 |
| 7.6 | 109 | 97.7 | 27.74 |
| 7.8 | 109.7 | 98.3 | 27.4 |

Highly purified 1-aminoanthraquinone, when benzoylated in the aforesaid manner has a benzoyl number of 28. It has been found that 1-aminoanthraquinone having a benzoyl number of 26.5 or more is sufficiently pure for use in the preparation of anthraquinone dyestuffs.

*Example 2.*—650 parts by volume of an aqueous solution of diammonium arsenate containing the equivalent of 264 parts of arsenic acid are mixed with 330 parts of "golden salt" comprising 310 parts of 1-anthraquinone-sodium sulfonate. The concentration of the anthraquinone sulfonate in the mixture is about 26.4 per cent. The mixture is agitated and rapidly heated in an autoclave to 180° and then over a period of 5 hours to 230°. The temperature is maintained at 225° to 230° for 9 hours. The mixture is then cooled and filtered, and the filter cake is washed with hot water and dried. 1-aminoanthraquinone can thus be obtained in yields of the order of 94% of theory.

*Example 3.*—1,515 parts of 75% aqueous arsenic acid (containing 1,136 parts of H₃AsO₄) are added to a solution of 600 parts of aqueous ammonia (26° Bé. at 16°) in about 3500 parts of water previously cooled to 0° to 5°. The rate of addition is controlled so as to maintain the temperature below 40°. Additional concentrated aqueous ammonia is added to adjust the pH value to 7 to 7.1, forming mainly diammonium arsenate. 1,250 parts of 1-anthraquinone-sodium sulfonate and 4,280 parts of water are added. The resulting mixture is agitated to form a uniform slurry and then heated with agitation in an autoclave at 218° to 220° for 12 hours, the pressure rising to about 320 to 330 pounds per square inch (gauge pressure). The pressure then is released to evacuate the ammonia, the latter being absorbed in an ammonia scrubber. The aminated mixture is filtered, and the 1-aminoanthraquinone, which is separated in the form of a filter cake, is washed with hot water at 85° to 95° until the washings are free of ammonia and arsenic acid, and is then dried at 90° to 110°. 803 parts of 1-aminoanthraquinone are obtained. The filtrate may be treated for recovery of ammonia and arsenic acid.

*Example 4.*—875 parts of aqueous ammonia (26° Bé. at 16°) are mixed with 2,375 parts of ice and 1,663 parts of 75% arsenic acid (containing 1,247 parts of H₃AsO₄). The pH of the solution is adjusted to 6.9 to 7.3 by further addition of ammonia, whereby diammonium arsenate is mainly formed. 1,360 parts of 1-anthraquinone-sodium sulfonate are added, and the mixture is agitated until a uniform slurry is formed. The latter is diluted with water to about 7,000 parts by volume and heated in an autoclave with continuous agitation to 230°. This temperature is maintained for 12 hours, the generated pressure rising to 340 to 380 pounds per square inch (gauge pressure). The pressure is then released, and the ammonia recovered in an ammonia scrubber. The aminated charge is filtered and the filter cake of 1-aminoanthraquinone is washed with hot water until the washings are free of ammonia and arsenic acid, as well as of colored impurities. After removing adhering water from the filter cake by blowing with compressed air or by suction, the product is dried at 90° to 110°. 1-aminoanthraquinone, generally having a benzoyl number of more than 26.5, is obtained in yields of the order of 91% to 93% of theory.

*Example 5.*—A mixture of 103 parts of 1,5-anthraquinone-disodium disulfonate and 700 parts by volume of aqueous diammonium arsenate (obtained by neutralizing an aqueous solution of 142 parts of arsenic acid with ammonia until the pH of the solution is 7.0 and diluting with water to 700 parts by volume) is agitated and heated in an autoclave. The temperature is maintained at 190° for 30 minutes, then at 200° for 30 minutes, then at 210° for 30 minutes, and finally at 220° for 24 hours. The contents of the autoclave are cooled to room temperature and the amination mixture is filtered. The filter cake is washed with hot water until free of soluble materials and the washed product is dried. A yield of 1,5-diaminoanthraquinone amounting to about 85% of theory can be thus obtained.

The process may be similarly employed for the preparation of other alpha-polyamino-anthraquinones by substituting, for the 1,5-anthraquinone disulfonate in the foregoing example, other anthraquinone - poly - alpha - sulfonates; for instance, 1,8-anthraquinone-disodium disulfonate, or mixtures thereof with 1,5-anthraquinone-disodium disulfonate.

Mono- and poly-beta-aminoanthraquinones also may be prepared from their corresponding sulfonates in a similar manner; but a higher temperature is required to effect substantial amination. Thus, if 2-anthraquinone-sodium sulfonate is substituted for the 1-anthraquinone sulfonate employed in Examples 1 to 4, and the reaction mixture is heated at about 250° to about 270° C., 2-aminoanthraquinone may be obtained. In a similar manner, the process of Example 5 may be employed at a temperature within the range of about 250° to about 270° C. for conversion of anthraquinone-beta-poly-sulfonates to the corresponding beta-polyamino-anthraquinones; for instance 2,6-anthraquinone-disodium disulfonate to 2,6-diaminoanthraquinone.

Variations and modifications can be made in the details of the foregoing procedure illustrated in the examples without departing from the scope of the invention, and accordingly the procedural details are to be interpreted in an illustrative rather than a limiting sense. Further, it is to be understood that all hydrogen ion concentrations (pH) mentioned in the specification, including the claims, are concentrations at 25° C.

I claim:

1. A process for the production of an alpha-aminoanthraquinone, which comprises heating a neutral alpha-anthraquinone sulfonate with an aqueous ammonium arsenate solution having a pH of 6.5 to 9.6, at a temperature of 200° to 250° C.

2. A process for the production of an alpha-aminoanthraquinone, which comprises heating a neutral alpha-anthraquinone sulfonate with an aqueous ammonium arsenate solution having a pH of 6.9 to 7.8 at a temperature of 220° to 240° C., said solution containing at least 3 molecular equivalents of ammonium radical per equivalent of sulfonate radical.

3. A process for the production of 1-aminoanthraquinone, which comprises heating a neutral 1-anthraquinone sulfonate with an aqueous ammonium arsenate solution having a pH of 6.9 to 7.8 at a temperature of 220° to 240° C.

4. A process for the production of 1-aminoanthraquinone, which comprises heating 1-anthraquinone-sodium sulfonate with an aqueous diammonium arsenate solution at a temperature of 220° to 240° C. for a period of 9 to 12 hours.

5. A process for the production of 1-aminoanthraquinone, which comprises mixing 1-anthraquinone-sodium sulfonate with an aqueous solution of an ammonium salt of arsenic acid having a pH of 6.9 to 7.3, to form a mixture containing from 10% to 26.5% of 1-anthraquinone-sodium sulfonate by weight and about 4 molecular equivalents of ammonium radical per molecular equivalent of sulfonate radical, and heating said mixture in a closed vessel at a temperature of 230° to 240° C. for 9 to 12 hours.

6. A process for producing 1-aminoanthraquinone from 1-anthraquinone-sulfonate contaminated with 2-anthraquinone-sulfonate, which comprises heating the contaminated 1-anthraquinone-sulfonate with an ammonium salt of arsenic acid in an aqueous solution having a pH of 6.5 to 9.6, at a temperature of 200° to 250° C., and separating the resulting 1-aminoanthraquinone from the remaining reaction mixture containing 2-anthraquinone sulfonate.

7. A process for producing 1-aminoanthraquinone from 1-anthraquinone-sodium sulfonate contaminated with 2-anthraquinone-sodium sulfonate, which comprises mixing said contaminated sulfonate with an aqueous solution of ammonium arsenate having a pH of 6.9 to 7.8, said solution containing about 4 molecular equivalents of ammonium radical per molecular equivalent of sulfonate radical, heating the mixture in a closed vessel at a temperature of 220° to 240° C., and separating the resulting 1-aminoanthraquinone from the remaining reaction mixture.

8. A process for the production of 1,5-diaminoanthraquinone, which comprises heating anthraquinone 1,5-disodium disulfonate with an aqueous ammonium arsenate solution having a pH of 6.9 to 7.8 at a temperature of 220° to 240° C. for about 24 hours, said solution containing about 4 molecular equivalents of ammonium radical per molecular equivalent of sulfonate radical.

CURT BAMBERGER.

REFERENCES CITED

The following references are of record in the file of this patent:

UNITED STATES PATENTS

| Number | Name | Date |
|---|---|---|
| 1,063,173 | Rampini | May 27, 1913 |

FOREIGN PATENTS

| Number | Country | Date |
|---|---|---|
| 169,667 | Great Britain | Oct. 6, 1921 |
| 59,571 | Switzerland | Nov. 11, 1911 |
| 59,572 | Switzerland | Nov. 11, 1911 |
| 59,573 | Switzerland | Nov. 11, 1911 |

Certificate of Correction

June 22, 1948.

Patent No. 2,443,885.

CURT BAMBERGER

It is hereby certified that errors appear in the printed specification of the above numbered patent requiring correction as follows: Column 2, line 16, for the German patent number "265,515" read *256,515*; column 3, lines 23 and 26 respectively, for the word "ration" read *ratio*; line 32, for "rations" read *ratios*; line 69, for "1-anthraquinoe-sodium" read *1-anthraquinone-sodium*; and that the said Letters Patent should be read with these corrections therein that the same may conform to the recod of the case in the Patent Office.

Signed and sealed this 7th day of September, A. D. 1948.

[SEAL]

THOMAS F. MURPHY,
*Assistant Commissioner of Patents.*